(12) United States Patent
Brown et al.

(10) Patent No.: US 8,425,813 B2
(45) Date of Patent: Apr. 23, 2013

(54) INJECTION MOLDING A HOLLOW PRODUCT

(75) Inventors: Paul Philip Brown, Ramona, CA (US); Jens Ole Sorensen, Rancho Santa Fe, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 235 days.

(21) Appl. No.: 13/126,131

(22) PCT Filed: Nov. 6, 2009

(86) PCT No.: PCT/US2009/006002
§ 371 (c)(1),
(2), (4) Date: Apr. 26, 2011

(87) PCT Pub. No.: WO2010/053565
PCT Pub. Date: May 14, 2010

(65) Prior Publication Data
US 2011/0198770 A1    Aug. 18, 2011

Related U.S. Application Data

(60) Provisional application No. 61/112,257, filed on Nov. 7, 2008.

(51) Int. Cl.
*B29C 45/36* (2006.01)
*B29C 45/37* (2006.01)
(52) U.S. Cl.
USPC ................ 264/40.5; 264/328.7; 264/328.12; 425/150; 425/577

(58) Field of Classification Search .................. 264/40.5, 264/250, 294, 328.1, 328.7, 328.11, 328.12; 425/150, 542, 577
See application file for complete search history.

(56) References Cited

U.S. PATENT DOCUMENTS

| | | | | |
|---|---|---|---|---|
| 3,608,133 A | * | 9/1971 | Cyriax | 425/577 |
| 5,034,170 A | * | 7/1991 | Briggs et al. | 264/40.5 |
| 5,174,941 A | * | 12/1992 | Sorensen | 264/250 |
| 5,409,656 A | * | 4/1995 | Naruse et al. | 264/275 |
| 6,168,734 B1 | * | 1/2001 | Botros | 264/40.1 |
| 6,277,308 B1 | * | 8/2001 | Kiernicki et al. | 264/1.25 |
| 6,936,213 B1 | * | 8/2005 | Brown | 264/328.1 |
| 7,175,789 B2 | * | 2/2007 | Brown et al. | 264/40.5 |

* cited by examiner

*Primary Examiner* — Jill Heitbrink
(74) *Attorney, Agent, or Firm* — Edward W. Callan

(57) ABSTRACT

The dimensions of a portion of an injection molded hollow product formed in a mold cavity between a first cavity surface of a cavity section and a first core surface of a core section are adjusted by adjusting the position of the first cavity surface relative to the position of the first core surface so that the first cavity surface and the first core surface are in a selected relative position when the cavity section is combined with the core section and a protractible and retractable core part is protracted so that a cavity abutment mold part can be connected directly to the protracted core part and the cavity abutment mold part also can be connected indirectly to the protracted core part by a series consisting of abutting mold parts. This series includes a pair of abutting rotatable eccentric rings, which are rotated to adjust the relative positions of the first cavity surface and the first core surface.

20 Claims, 8 Drawing Sheets

INJECTION MOLDING A HOLLOW PRODUCT

BACKGROUND OF THE INVENTION

The present invention generally pertains to injection molding a hollow product, and, in different aspects, is directed to (a) adjusting the dimensions of a hollow injection molded product, (b) injection molding a hollow product having a rim at an opening of the product, (c) bleeding air from a mold cavity during injection of the molding material, and (d) the characteristics of a region in which a contact surface of a stripper ring contacts a portion of a protractible and retractable core part.

It is known to control the dimensions of the sidewall of an injection molded hollow product during an initial injection of molding material by stabilizing a protractible and retractable core part within the mold cavity that shapes the hollow product. The mold cavity is positioned between a cavity section and a core section of the mold when the cavity section is combined with the core section. Stabilization of the core part is achieved by protracting the core part so that it abuts against a portion of the cavity section. This stabilization technique is described in many prior patents, including U.S. Pat. Nos. 3,737,272 to Bruno Segmuller, 4,422,995 and 5,174,941 to Jens Ole Sorensen, who is one of the inventors of the subject matter of the present invention. It is also described in Australian Patent Specification No. 17,577/70 filed by Louis Ryles.

SUMMARY OF THE INVENTION

In one aspect, the present invention provides a method of adjusting the dimensions of a hollow product formed by injection molding in a mold that includes a mold cavity that is positioned between a cavity section and a core section of the mold when the cavity section is combined with the core section, wherein the cavity section includes a first cavity surface for forming at least a portion of the outer surface of the hollow product, and a cavity abutment mold part, and the core section includes a first core surface for forming at least a portion of the inner surface of the hollow product, and a core abutment mold part, the method comprising the step of:

(a) adjusting the position of the first cavity surface relative to the position of the first core surface so that the first cavity surface and the first core surface are in a selected relative position when the cavity section is combined with the core section; and wherein when the cavity section is combined with the core section, the cavity abutment mold part can be connected directly to the core abutment mold part and the cavity abutment mold part also can be connected indirectly to the core abutment mold part by a series consisting of abutting mold parts, one rotatable component and another rotatable component;

wherein the one rotatable component of the series includes at least the shape of a portion of an eccentric ring and has a first edge disposed in circular slideable contact with one mold part of the series;

wherein the other rotatable component of the series includes at least the shape of a portion of an eccentric ring and has a first edge disposed in circular slideable contact with another mold part of the series;

wherein a second edge of the one rotatable component is disposed in direct or indirect circular slideable contact with a second edge of the other rotatable component;

wherein step (a) comprises the steps of:

(b) rotating the one rotatable component to thereby adjust the relative positions of the first cavity surface and the first core surface; and (c) rotating the other rotatable component to thereby adjust the relative positions of the first cavity surface and the first core surface.

This aspect of the present invention also includes apparatus related to the above described method for adjusting the dimensions of a hollow product.

In a further aspect, present invention provides a method of injection molding a hollow product having a rim at an opening of the product in a mold that includes a cavity section and a core section, which when combined shape a mold cavity in which the hollow product is formed when molding material is injected into the mold cavity, wherein the core section includes a protractible and retractable core part, the method comprising the steps of:

(a) when the cavity section is combined with the core section and the core part is protracted, injecting pressurized molding material into the mold cavity so that the injected molding material flows toward a portion of the mold cavity that shapes the rim at the opening of the product, wherein when the core section is protracted a portion of the mold cavity that forms the rim is blocked by a piece of the core part;

(b) retracting the core part so that the portion of the mold cavity that forms the rim is not blocked by the piece of the core part; and (c) when the core part is retracted, causing the unblocked portion of the mold cavity to be filled with injected molding material.

This further aspect of the present invention also includes a mold related to the above described method for injection molding a hollow product having a rim at an opening of the product.

Another aspect of the present invention includes a mold for injection molding a hollow product, comprising: a cavity section and a core section, which when combined shape a mold cavity in which the hollow product is formed when molding material is injected into the mold cavity, wherein the core section includes a protractible and retractable core part; wherein the cavity section includes a first cavity sidewall-forming surface for forming at least a portion of the outer surface of a side wall of the hollow product and the core section includes a first core sidewall-forming surface for forming at least a portion of the inner surface of the side wall of the hollow product; wherein the core section and cavity section further includes a core shoulder surface and a cavity shoulder surface for forming at least a portion of a shoulder of the product, the shoulder surfaces having a plurality of regions for abutting against each other when the core part is protracted, with there being spaces between the abutting regions through which molding material injected into the mold cavity from a gate disposed on the other side of the abutting regions from the first cavity sidewall-forming surface and the first core sidewall-forming surface can flow toward the portion of the mold cavity shaped by the first cavity sidewall forming surface and the first core sidewall forming surface; wherein one or more of the abutting regions are indented on the back sides thereof that are opposite the sides of the abutting regions that face the gate, with the indentations being disposed for receiving molding material that has flowed through the spaces between the abutting regions; and wherein the core section and/or the cavity section includes one or more vents through one or more of the shoulder surfaces, with the one or more vents communicating with the indentations for bleeding air from the indentations during injection of the molding material.

This other aspect of the present invention also includes a method related to the above described mold for injection molding a hollow product.

In yet another aspect the present invention provides a mold for injection molding a hollow product, the mold comprising: a cavity section and a core section, which when combined shape a mold cavity in which the hollow product is formed when molding material is injected into the mold cavity, wherein the core section includes a protractible and retractable core part; and a stripper ring for ejecting an injected molded product from the mold cavity; wherein a stripper contact surface of the stripper ring contacts a core contact surface of a portion of the core part when the cavity section is combined with the core section and the core part is in a protracted position; and wherein the stripper contact surface and the core contact surface are inclined at a first oblique angle to the longitudinal axis of the mold cavity in a first region adjacent the end of the stripper ring that contacts the molded product during said ejection of the product, and are inclined at a second angle to said longitudinal axis in a second region adjacent the other end of the stripper ring, with the first oblique angle being different from the second angle.

Additional features of the present invention are described with reference to the detailed description of the preferred embodiments.

BRIEF DESCRIPTION OF THE DRAWING

The drawing figures herein are not drawn to scale.

DETAILED DESCRIPTION

Figure 1:
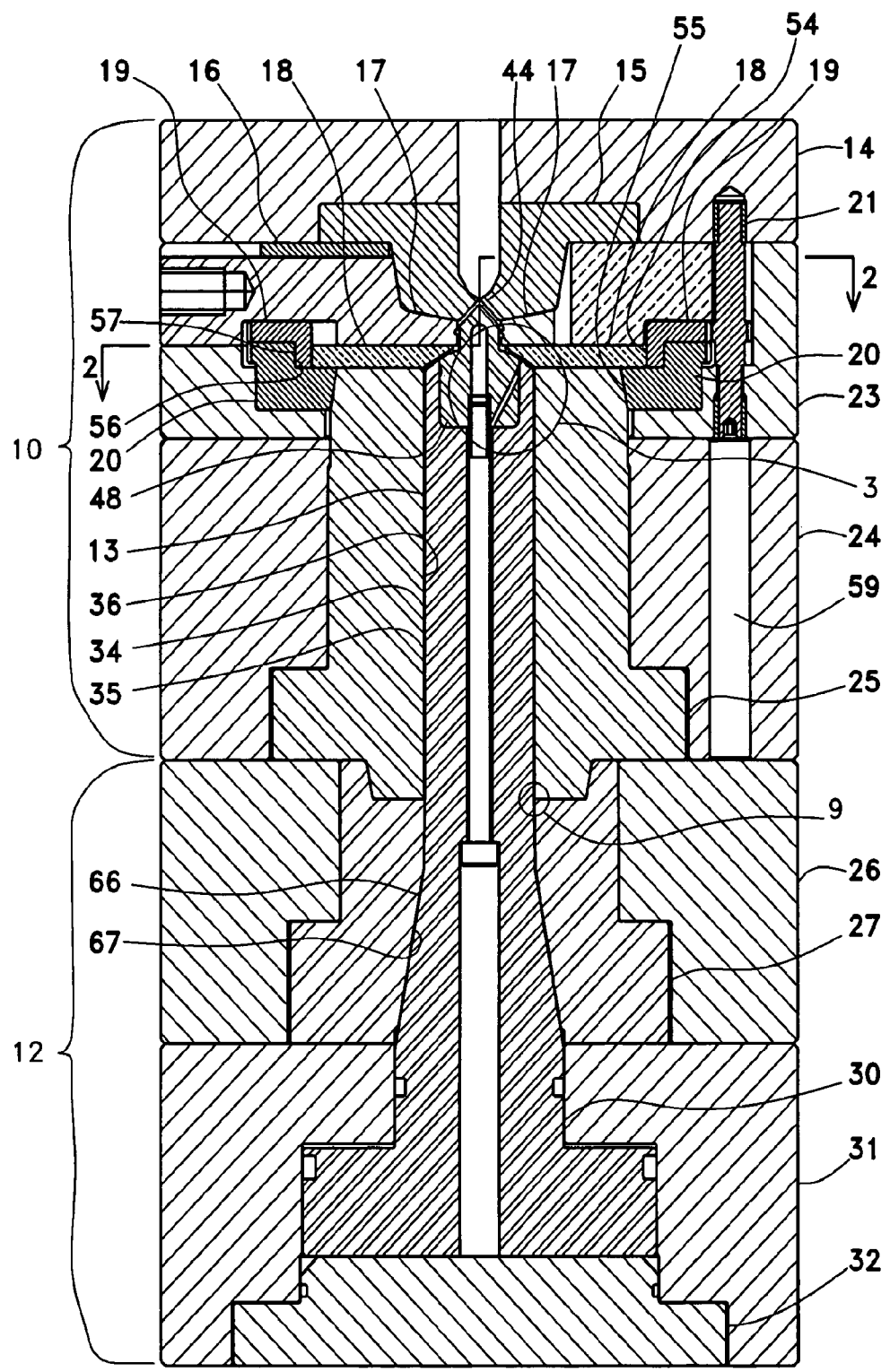
FIG. 1 is a sectional view of an exemplary embodiment of a mold for injection molding hollow products in accordance with the present invention when the core section is combined with the cavity section, with said view being along line 1-1 in FIG. 2.
Figure 2:
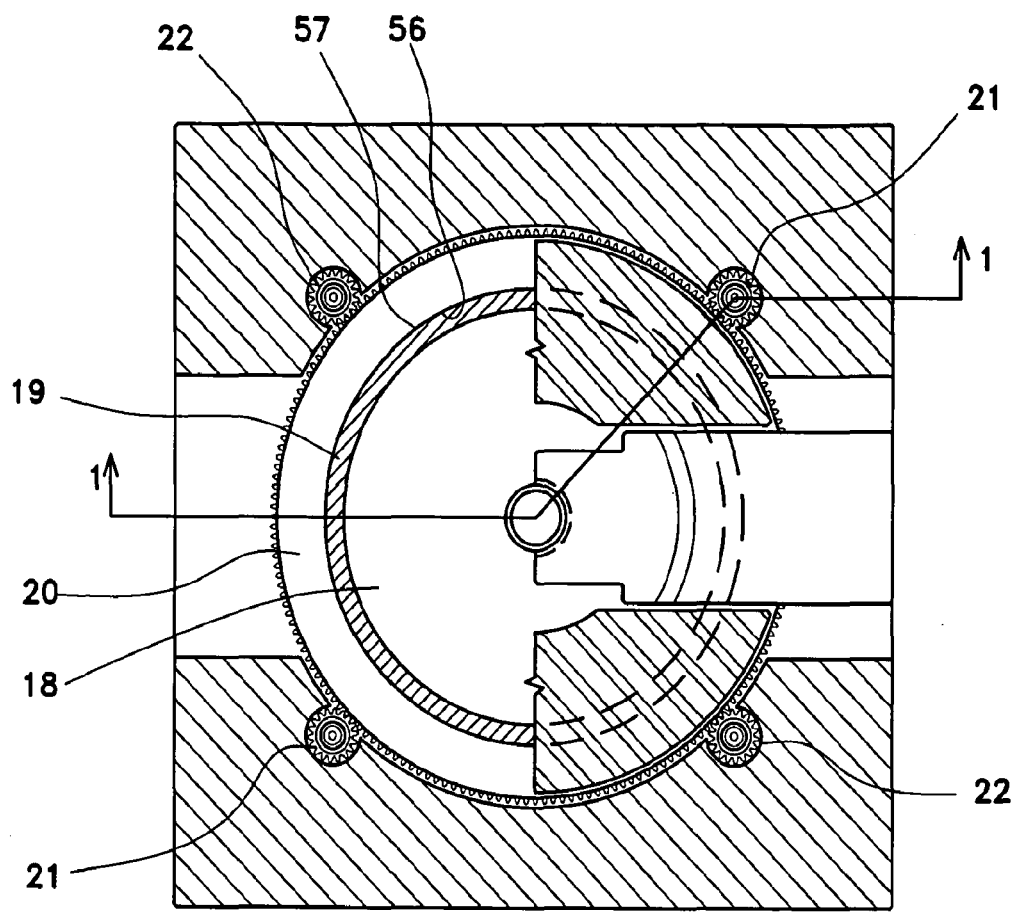
FIG. 2 is a sectional view of the mold shown in FIG. 1, with said view being along line 2-2 in FIG. 1.
Figure 3:
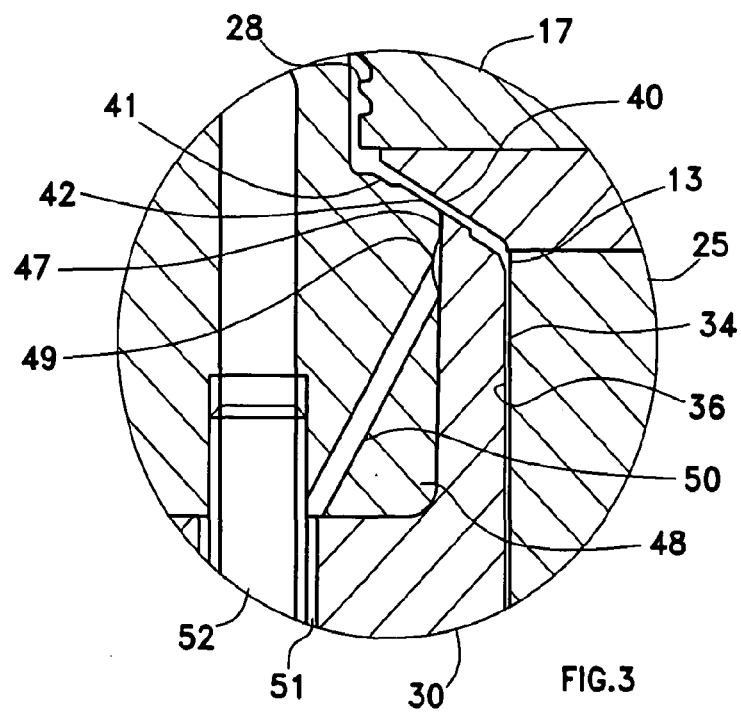
FIG. 3 is an enlarged sectional view of an encircled portion 3 of the mold shown in FIG. 1.

Referring to FIGS. 1, 2, 3 and 4, an exemplary embodiment of a mold for injection molding hollow products in accordance with the present invention includes a cavity section 10 and a core section 12. A mold cavity 13 for forming an injection molded hollow product is positioned between the cavity section 10 and the core section 12 of the mold when the cavity section 10 is combined with the core section 12.

The cavity section 10 includes an injection backing plate 14, a gate pad 15, a wear plate 16, a pair of slides 17, a pair of movable cavity inserts 18, a rotatable inner eccentric ring 19, a rotatable outer eccentric ring 20, a first pair of rotation drivers 21 for rotating the inner eccentric ring 19, a second pair of rotation drivers 22 for rotating the outer eccentric ring 20, an intermediate plate 23, a cavity plate 24 and a cavity insert 25. The inner edge 28 of each slide 17 is shaped for forming a screw thread in a portion of the exterior of the injection molded hollow product when the slides 17 are combined. The slides 17 are separable for enabling the injection molded hollow product to be removed from the mold. In some alternative embodiments, the inner edge of each slide 17 is not shaped for forming a screw thread in a portion of the exterior of the injection molded hollow product.

The core section 12 includes a protractible and retractable core part 30, a core plate 31, a cylinder-end cap 32, a stripper plate 26 and a stripper ring 27.

Figure 4:
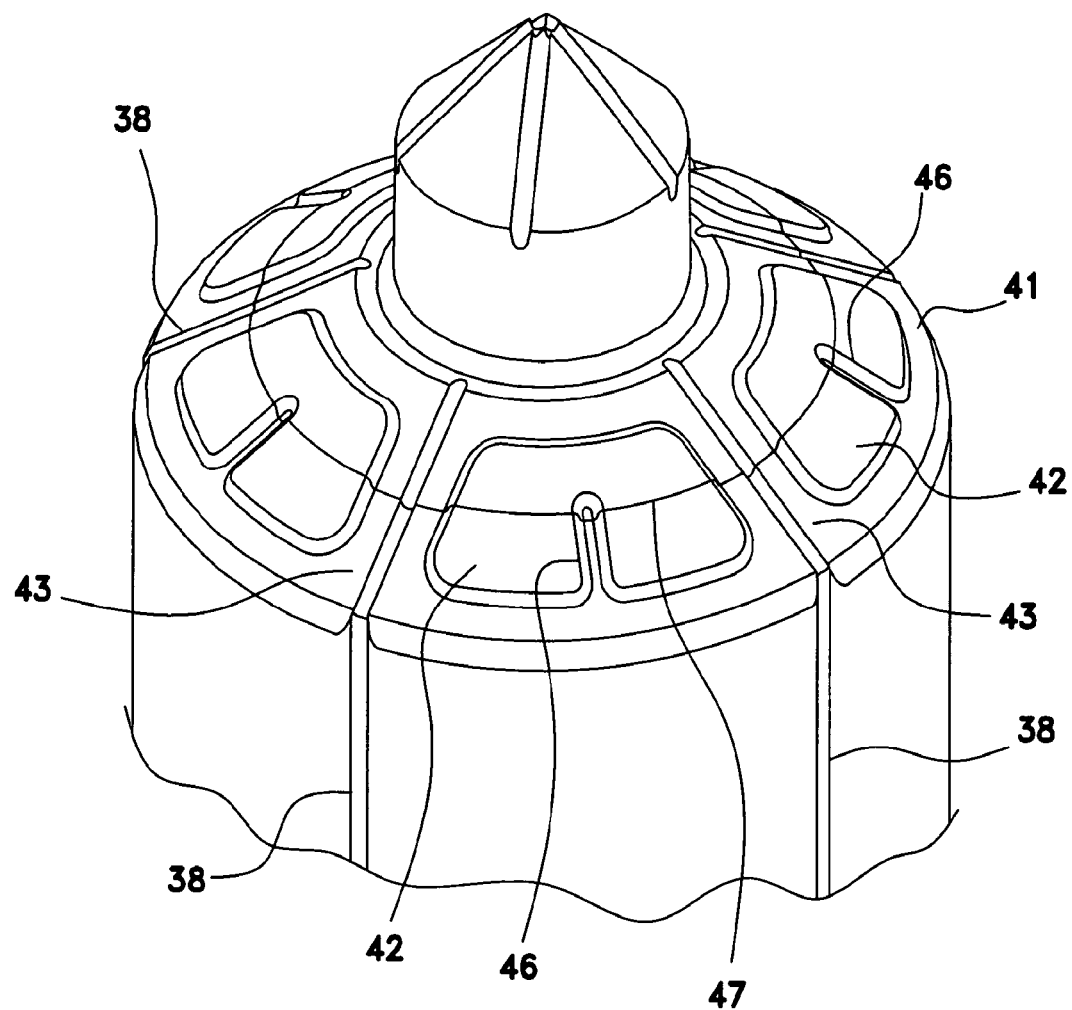
FIG. 4 is perspective view of the distal portion of the core section included in the mold shown in FIG. 1.

The cavity section 10 includes a first cavity surface 34 for forming at least a portion of the outer surface of a sidewall of the hollow product; and the core part 30 includes a first core surface 36 for forming at least a portion of the inner surface of the sidewall of the hollow product. The mold cavity 13 includes flow channels for directing the flow of injected molding material within the mold cavity. The flow channels are shaped at least in part by channels 38 in the core section 30, as shown in FIG. 4.

The movable cavity inserts 18 include a cavity shoulder surface 40 and the core part 30 includes a core shoulder surface 41. The cavity shoulder surface 40 and the core shoulder surface 41 are for forming at least a portion of a shoulder of the product.

The core shoulder surface 41 has a plurality of raised regions 42 for abutting against the cavity shoulder surface 40 when the core part 30 is protracted. There are spaces 43 between the raised regions 42 through which molding material injected into the mold cavity 13 from a gate 44 disposed on the other side of the raised regions 42 from the sidewall-forming surfaces 34, 36 and can flow toward the portion of the mold cavity 13 shaped by the sidewall-forming surfaces 34, 36.

In alternative embodiments (not shown), the cavity shoulder surface 40 has a plurality of raised regions for abutting against the core shoulder surface 41 when the core part 30 is protracted, either in combination with the raised regions 42 in the core shoulder surface 41 or in lieu thereof.

One or more of the regions 42 include indentations 46 on the back sides thereof that are opposite the sides of the regions 42 that face the gate 44. The indentations 46 are disposed for receiving molding material that has flowed through the spaces 43 between the regions 42.

The core part 30 includes one or more vents 47 through the core shoulder surface 41. The one or more vents 47 communicate with the indentations 46 for bleeding air from the indentations 46 during injection of the molding material. In the exemplary embodiment of FIGS. 1 to 4, there is one vent 47. The vent 47 is disposed between an insert 48 within the core part 30 and the remainder of the core part 30. The vent 47 communicates with a circumferential conduit 49, from which there are one or more conduits 50 for directing the air that is bled from the indentations 46 away from interior of the mold via a well 51 that contains a drive shaft 52 for the core part 30.

In some alternative embodiments (not shown), the movable cavity inserts 18 include one or more vents through the cavity shoulder surface 40 for bleeding air from the indentations 46 during injection of the molding material, either in combination with the one or more vents 47 in the core shoulder surface 40 or in lieu thereof.

The inner eccentric ring 19 and the outer rotatable eccentric ring 20 are disposed for adjusting the position of the first cavity surface 34 relative to the position of the first core surface 36 so that the first cavity surface 34 and the first core surface 36 are in a selected relative position when the cavity section 10 is combined with the core section 12.

The inner eccentric ring 19 has a first edge 54 disposed in circular slideable contact with the movable cavity inserts 18. The outer eccentric ring 20 has a first edge 55 disposed in circular slideable contact with the cavity insert 25. A second edge 56 of the inner eccentric ring 19 is disposed in direct circular slideable contact with a second edge 57 of the outer eccentric ring 20. The second edge 56 of the inner eccentric ring 19 is an outer-facing edge of the inner eccentric ring 19; and the second edge 57 of the outer eccentric ring 20 is an inner-facing edge of the outer eccentric ring 20.

In some alternative embodiments (not shown), the second edge of the inner eccentric ring is disposed in indirect circular slideable contact with a second edge of the outer eccentric ring and/or rotatable components having the shape of a portion of an eccentric ring are used in lieu of eccentric rings per se.

The first pair of rotation drivers 21 is disposed for rotating the inner eccentric ring 19, to thereby adjust the relative positions of the first cavity surface 34 and the first core surface 36. The second pair of rotation drivers 22 is disposed for rotating the outer eccentric ring 20 to thereby further adjust the relative positions of the first cavity surface 34 and the first core surface 36. The rotation drivers 21, 22 can be accessed for operation thereof through cavities 59 in the cavity plate 24 when the cavity plate 24 is separated from the stripper plate 26.

The use of eccentric rings for adjusting relative positions of different components of a mold is described in more detail in U.S. Pat. No. 6,936,213 to Paul Philip Brown, one of the inventors of the subject matter of the present application.

When the cavity section 10 is combined with the core section 12 and the protractible and retractable core part 30 is protracted, the core part 30 functions as a core abutment mold part and the movable cavity inserts 18 function as a cavity abutment mold part; whereby the cavity abutment mold part (movable cavity inserts 18) can be connected directly to the core abutment mold part (core part 30) and the movable cavity inserts 18 also can be connected indirectly to the core abutment mold part 30 by a series of components consisting of the rotatable inner eccentric ring 19, the rotatable outer eccentric ring 20, the cavity insert 25 and the stripper ring 27.

In some alternative embodiments (not shown), the composition of the cavity section and/or the core section are other than in the embodiment of FIGS. 1 to 4, and components of the cavity section and the core section other than movable cavity inserts and/or a protractible and retractable core part may function respectively as the cavity abutment mold part and the core abutment mold part.

When the cavity section 10 is combined with the core section 12, the protractible and retractable core part 30 is protracted so that the cavity abutment mold part 18 is connected both directly and indirectly to the core abutment mold part 30 to thereby stabilize the position of the core part 30 within the mold cavity 13.

The steps of combining the cavity section 10 with the core section 12; directly connecting the cavity abutment mold part 18 to the core abutment mold part 30; and indirectly connecting the cavity abutment mold part 18 to the core abutment mold part 30 do not have to be performed in any particular order and may be performed simultaneously.

The dimensions of the sidewall of the hollow product formed in the portion of the mold cavity 13 that is shaped by the first cavity surface 34 and the first core surface 36 are adjusted by adjusting the position of the first cavity surface 34 relative to the position of the first core surface 36 so that the first cavity surface 34 and the first core surface 36 are in a selected relative position when the cavity section 10 is combined with the core section 12. The adjustment of the relative positions of the first cavity surface 34 and the first core surface 36 is accomplished by rotating the inner eccentric ring 19 and the outer eccentric ring 20.

After adjusting the relative positions of the first cavity surface 34 and the first core surface 36, the cavity section 10 is combined with the core section 12; a test product is injection molded in the mold cavity 13; the dimensions of the sidewall of the test product formed in the portion of the mold cavity 13 that is shaped by the first cavity surface 34 and the first core surface 36 are measured; and further adjustments are made, when necessary, until the measured dimensions are the desired dimensions.

When the protractible and retractable core part 30 is protracted to thereby stabilize the position of the core part 30 within the cavity section 10 after the relative positions of the first cavity surface 34 and the first core surface 36 have been adjusted to achieve the desired dimensions of the sidewall, pressurized molding material is injected into the mold cavity 13 to form the hollow product.

FIGS. 5, 6, 7 and 8 illustrate the flow of injected molding material 61 over the core shoulder surface 41 of the distal portion of the core section 30 (FIG. 4) when the core section 30 is protracted so that the raised regions 42 of the core shoulder surface 41 abut against the cavity shoulder surface 40 of the movable cavity inserts 18.

Figure 5:
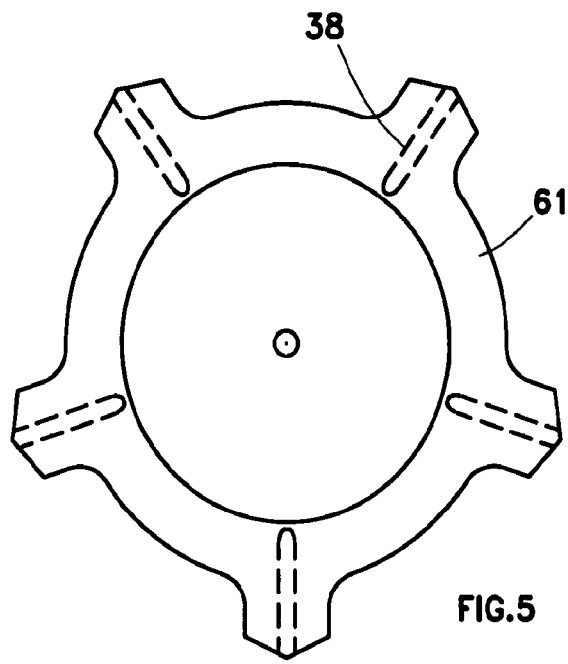
FIG. 5 shows an early stage of the flow of injected molding material over the distal portion of the core section shown in FIG. 4.
Figure 6:
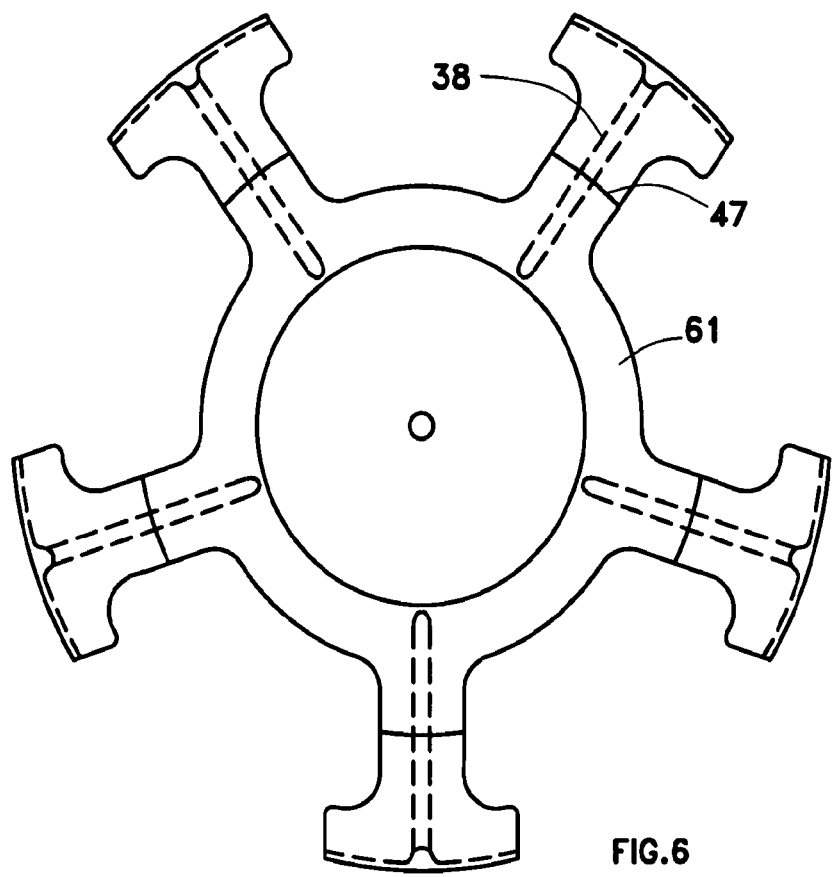
FIG. 6 shows a first intermediate stage of the flow of injected molding material over the distal portion of the core section shown in FIG. 4.
Figure 7:
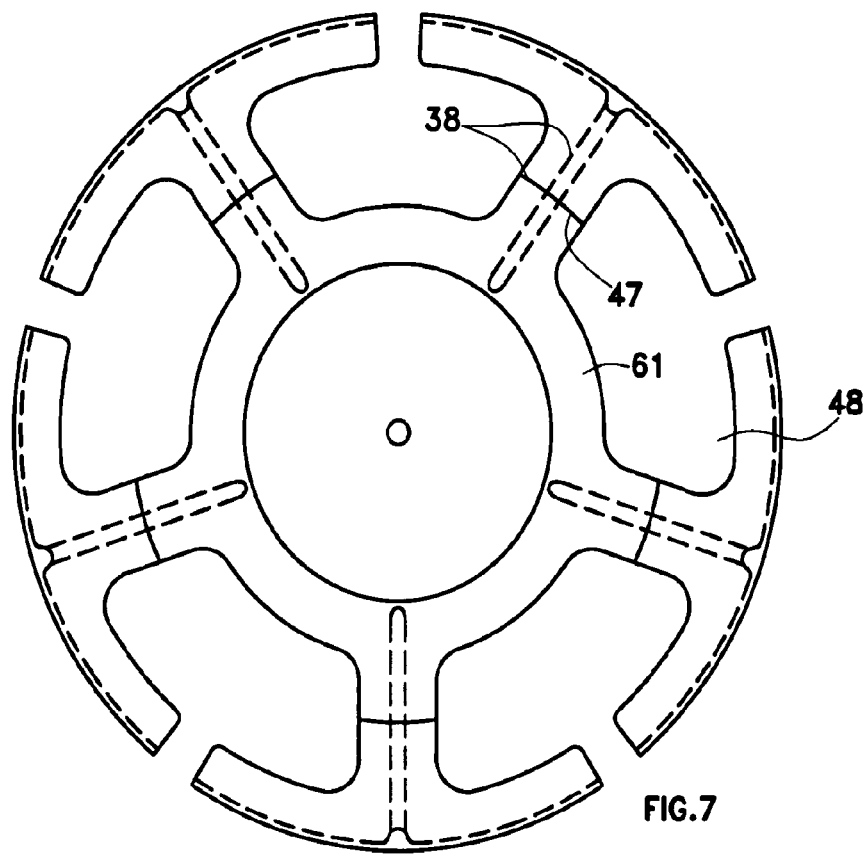
FIG. 7 shows a later intermediate stage of the flow of injected molding material over the distal portion of the core section shown in FIG. 4.
Figure 8:
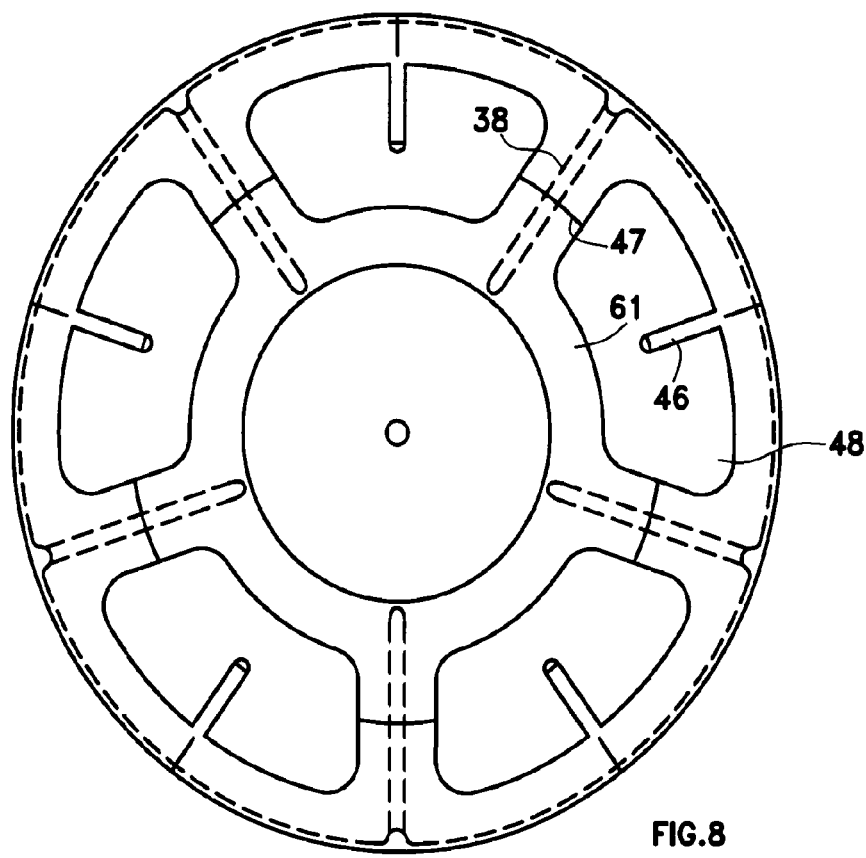
FIG. 8 shows the final stage of the flow of injected molding material over the distal portion of the core section shown in FIG. 4.

FIG. 5 shows an early stage of the flow of injected molding material 61; FIG. 6 shows a first intermediate stage of the flow of injected molding material 61; FIG. 7 shows a later intermediate stage of the flow of injected molding material 61; and FIG. 8 shows the final stage of the flow of injected molding material 61. Dashed lines are used to shown the positions of the channels 38 in the core section 30 that at least in part shape the flow channels in the mold cavity 13. Solid lines are used to show the portions of the vent 47 that is covered by the flow of injected molding material 61. In the final stage shown in FIG. 8, the flow of injected molding material 61 enters the indentations 46 in the regions 42. The thickness of the flow of injected molding material 61 over the core shoulder surface 41 outside the regions 42 while the core part 30 is protracted is approximately 0.5 mm.

At a time during a period over which the molding material is injected into the mold cavity 13, the cavity abutment mold part 18 is disconnected from the core abutment mold part 30 by retracting the core part 30. The core part 30 is retracted to disconnect the cavity abutment mold part 18 from the core part 30 at a time when the position of core part 30 within the cavity section 10 is so stabilized by at least partially solidified molding material that the desired dimensions of the sidewall of the hollow product formed in the portion of the mold cavity 13 that is shaped by the first cavity surface 34.

In some embodiments, the injection of molding material into the mold cavity 13 is not interrupted while the core part 30 is being retracted. In other embodiments, injection of molding material into the mold cavity 13 is interrupted while the core part 30 is being retracted.

In some alternative embodiments (not shown), the dimensions of some other portion of a hollow product (other than the sidewall of the hollow product formed in the portion of the mold cavity 13 that is shaped by the first cavity surface 34 and the first core surface 36) are adjusted by adjusting the position of a second cavity surface relative to the position of a second core surface (the other portion of the product being shaped by the second cavity surface and the second core surface) so that the second cavity surface and the second core surface are in a selected relative position when the cavity section is combined with the core section. Such an adjustment is likewise accomplished by rotating eccentric rings to thereby adjust the relative positions of the second cavity surface and the second core surface.

The aspect of the present invention pertaining to injection molding a hollow product having a rim at an opening of the product is discussed with reference to FIGS. 9 and 9A. The portion of the mold cavity 13 that shapes the rim at the opening of the product is the portion of the mold cavity 13 that is disposed between the protractible and retractable core part 30 and the cavity insert 25 adjacent the stripper ring 27.

Figure 9A:
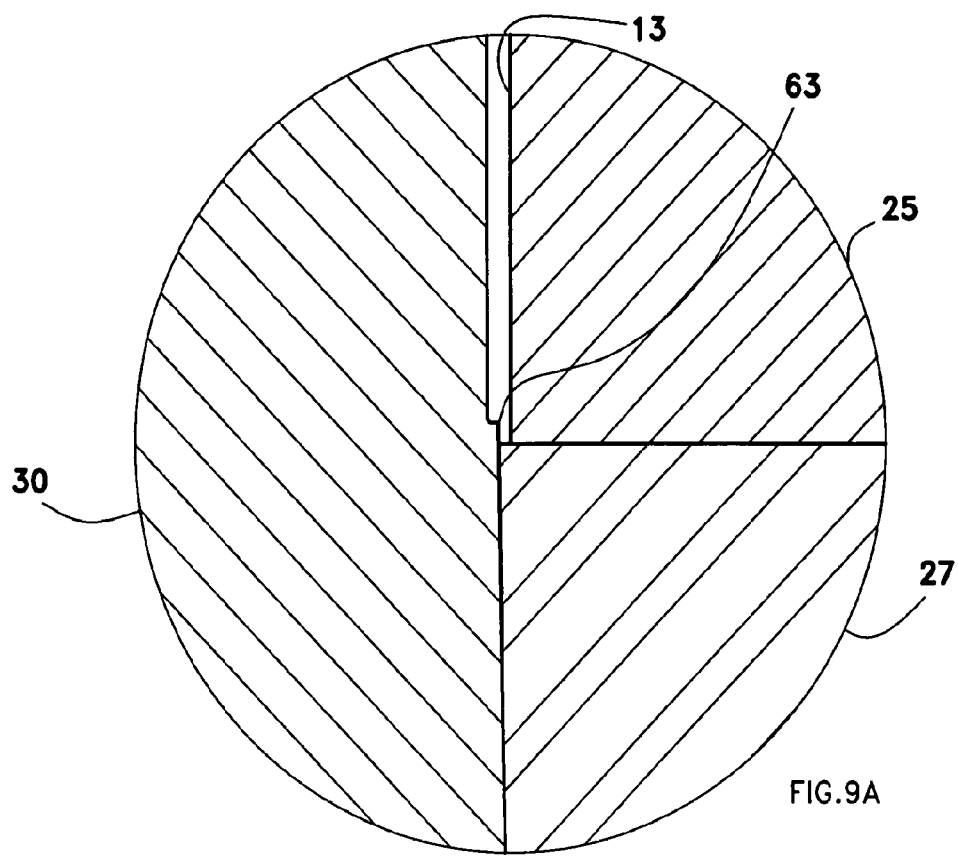
FIG. 9A is a sectional view of the portion of the mold shown in FIG. 9, with the core section in a protracted position.

FIG. 9A shows the relative positions of the core part 30, the cavity insert 25 and the stripper ring 27 when the core part 30 is protracted. FIG. 9 shows the relative positions of the core part 30, the cavity insert 25 and the stripper ring 27 when the core part 30 is retracted.

When the cavity section 10 is combined with the core section 12 and the core part 30 is protracted, pressurized molding material is injected into the mold cavity so that the injected molding material flows toward the portion of the mold cavity that shapes the rim at the opening of the product, as shown in FIG. 9A. However, when the core part 30 is protracted a portion of the mold cavity 13 that forms the rim is blocked by a piece 63 of the core part 30.

Figure 9:
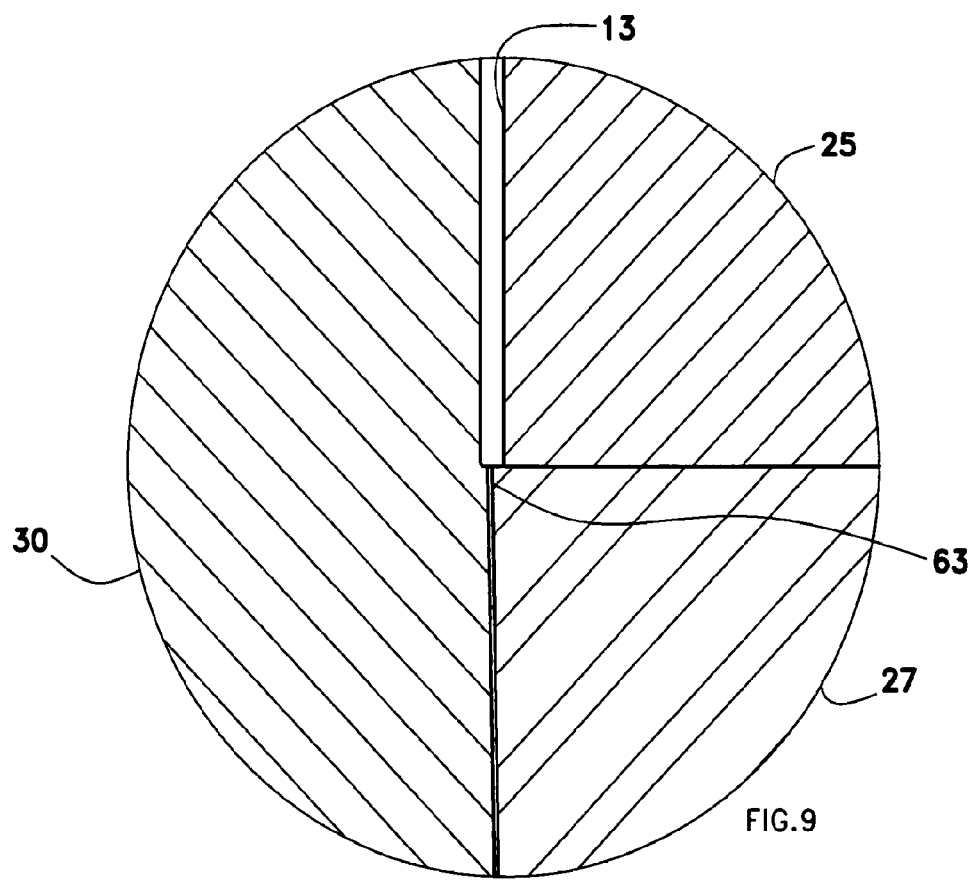
FIG. 9 is an enlarged sectional view of an encircled portion 9 of the mold shown in FIG. 1, with the core section in a retracted position.

The core part 30 is so dimensioned that when the core part 30 is retracted, as shown in FIG. 9, the portion of the mold cavity that forms the rim is not blocked by the piece 63 of the core part. When the core part 30 is retracted, as shown in FIG. 9, injection of molding material continues and the portion of the mold cavity 13 that is no longer blocked by the piece 63 of the core part is filled with the injected molding material so that the portion of the mold cavity 13 that shapes the sidewall of the product is substantially uniform throughout the portion of the mold cavity 13 that forms the rim of the product and the portion of the mold cavity 13 that forms the portion of the sidewall that is adjacent the rim.

The aspect of the present invention pertaining to the characteristics of a region in which a contact surface of a stripper ring contacts a portion of a protractible and retractable core part is discussed with reference to FIG. 10. The alternative embodiment of a mold according to the present invention shown in FIG. 10 has the same components and features as embodiment of the mold described above with reference to FIGS. 1 to 9, except as described below.

In both embodiments the stripper ring 27, 27' is used for ejecting an injected molded product from the mold cavity 13, 13' and a stripper contact surface 66, 66' of the stripper ring 27, 27' contacts a core contact surface 67, 67' of a portion of the core part 30, 30' when the cavity section 10, 10' is combined with the core section 12, 12' and the core part 30, 30' is in a protracted position.

In some embodiments, in which a portion of the mold cavity 34 that defines a sidewall of the hollow product is inclined at an angle of less than approximately one-degree to the longitudinal axis of the mold cavity 13, a sheet of image-bearing material 35 is disposed in relation to the cavity section or the core section prior to combining the cavity section 10 with the core section 12 so that the sheet of image-bearing material is disposed within the portion of the mold cavity 13 that defines the sidewall of the product when the cavity section 10 is combined with the core section 12. In some such embodiments, the angle of inclination is approximately one-tenth-of-one degree. Typically, the sheet of image-bearing material 35 includes a product label and/or a decoration.

Figure 10:
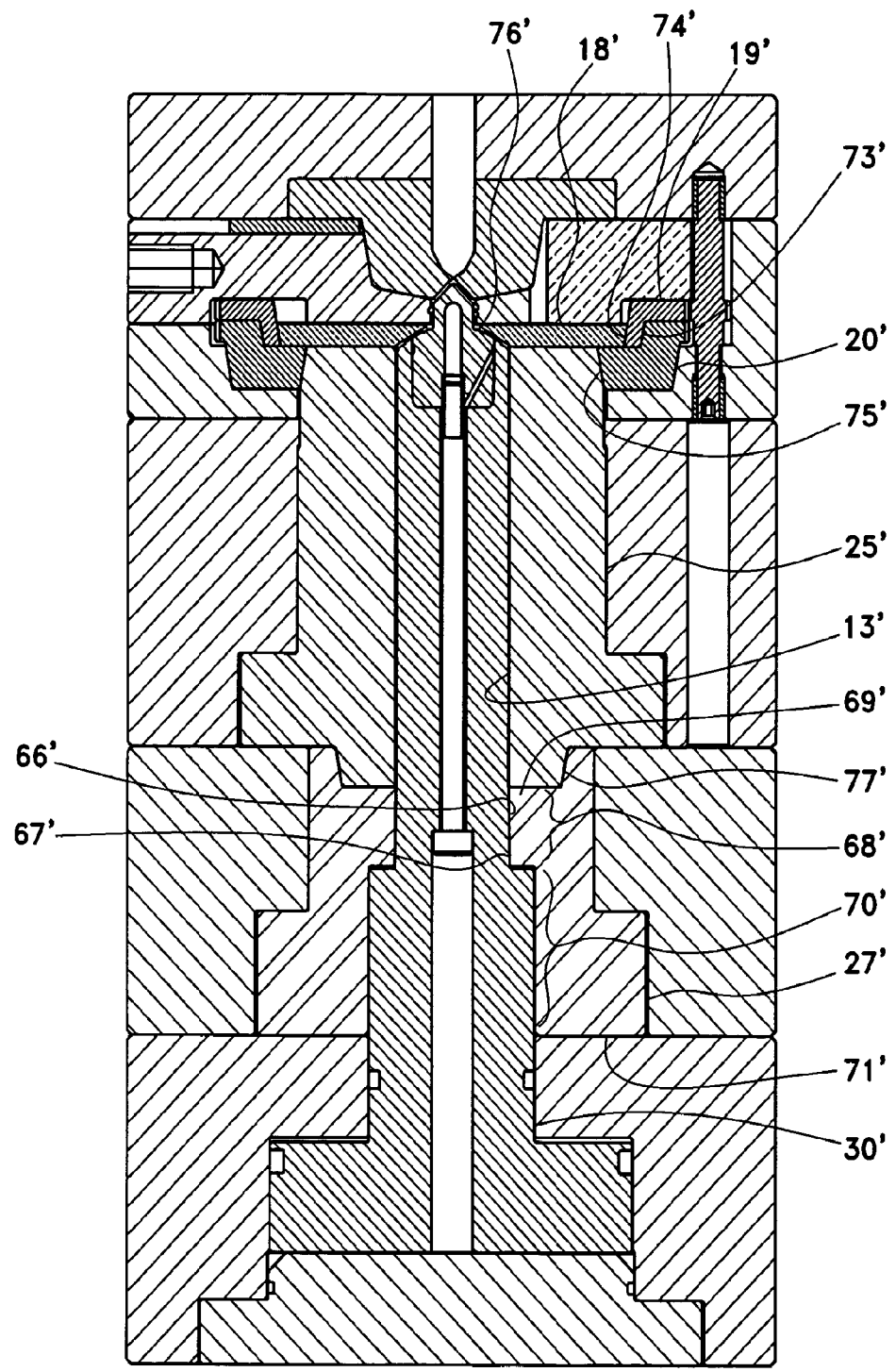
FIG. 10 is a sectional view of an alternative embodiment of a mold for injection molding hollow products in accordance with the present invention, with said view being from the same viewpoint as in FIG. 1.

In the alternative embodiment of FIG. 10, the stripper contact surface 66' and the core contact surface 67' are inclined at a first oblique angle to the longitudinal axis of the mold cavity 13' in a first region 68' adjacent the end 69' of the stripper ring 27' that contacts the molded product during ejection of the product, and are inclined at a second angle to said longitudinal axis in a second region 70' adjacent the other end 71' of the stripper ring 27', with the first oblique angle being different from the second angle.

Preferably, the length of the second region 70' projected on the longitudinal axis of the mold cavity 13' is longer than the length of the first region 68' projected on said longitudinal axis.

Preferably, the first oblique angle of inclination in the first region 68' is larger than the second angle of inclination in the second region 70'.

Preferably, first angle of inclination is approximately one degree and the second angle of inclination is zero degrees or approximately zero degrees.

The advantage of this aspect of the present invention is reduction of wear between the stripper ring 27' and the core part 30' in the region where both the stripper ring 27' and the core part 30' meet the rim of the product.

The embodiment of FIG. 10 also includes an inclined-abutting-edge/surface feature that may be included in all of the various embodiments discussed herein.

The second edge of the inner eccentric rings 19' and the second edge of the outer eccentric rings 20' that abut against one another at 73' are inclined at an oblique angle to the longitudinal axis of the mold cavity 13' when the cavity section 10' is combined with the core section 12'.

The first edge of the inner eccentric ring 19' and the edges of the movable cavity inserts 18' that abut against one another at 74' are inclined an oblique angle to the longitudinal axis of the mold cavity 13' when the cavity section 10' is combined with the core section 12'.

The first edge of the outer eccentric ring 20' and the edge of the cavity insert 25' that abut against one another at 75' are inclined at an oblique angle to the longitudinal axis of the mold cavity 13' when the cavity section 10' is combined with the core section 12'.

The shoulder surfaces 40 of the movable cavity inserts 18' and the surfaces of the raised regions 42 of the shoulder surface 41 of the core part 30' that abut against one another at 76' are inclined at an oblique angle to the longitudinal axis of the mold cavity 13' when the cavity section 10' is combined with the core section 12'.

The edge of the cavity insert 25' and the edge of the stripper ring 27' that abut against one another at 77' are inclined at an oblique angle at 77' to the longitudinal axis of the mold cavity 13' when the cavity section 10' is combined with the core section 12'.

The edge of the stripper ring 27' and the edge of the core part 30 that abut against one another in the region 68' are inclined at an oblique angle to the longitudinal axis of the mold cavity 13' when the cavity section 10' is combined with the core section 12'.

In the embodiment of FIG. 10, all of the mold parts and components of the series that can indirectly connect the cavity abutment mold part 18' to the core abutment mold part 30' include edges or surfaces that are (i) disposed for abutting an edge or surface of another mold part or component of the series, and (ii) inclined at an oblique angle to the longitudinal axis of the mold cavity when the cavity section is combined with the core section.

Some of the inclined-abutting-edge/surface features of the alternative embodiment of FIG. 10 are also shown in the embodiment described above with reference to FIGS. 1-9.

Figure 11:
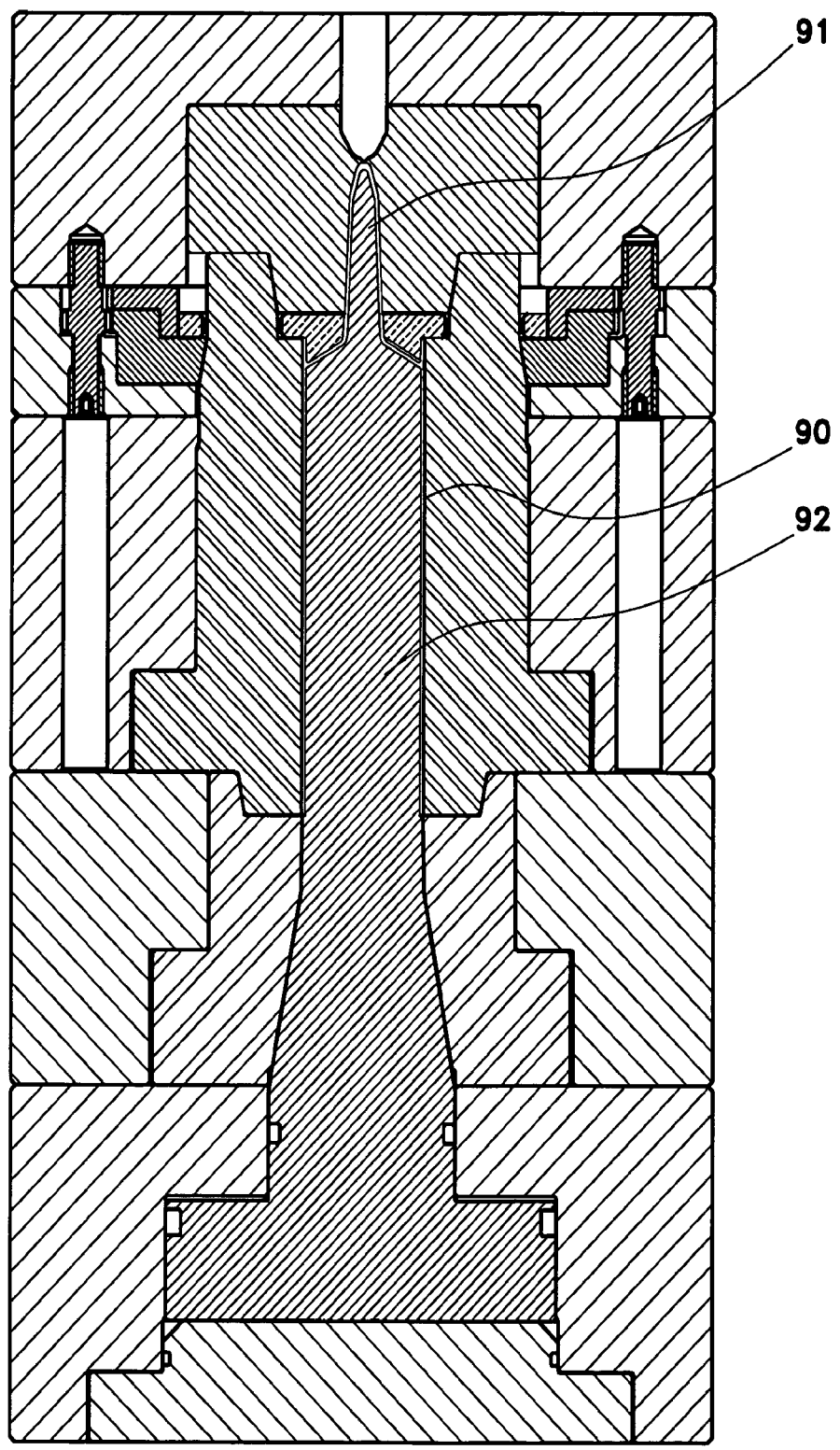
FIG. 11 is a sectional view of another alternative embodiment of a mold for injection molding hollow products in accordance with the present invention.

The alternative embodiment of the mold shown in FIG. 11 has the same components and features as embodiment of the mold described above with reference to FIGS. 1 to 9, except that the mold cavity 90 is configured for injection molding a calking tube having an extended snout formed without screw threads about an extended distal end 91 of a core part 92. Also, the mold of FIG. 11 does not include slides such as the slides 17 that are included in the embodiment of FIGS. 1-4

The various embodiments described herein may be combined with one another to the extent that they are not incompatible with one another.

The benefits specifically stated herein do not necessarily apply to every conceivable embodiment of the present invention. Further, such stated benefits of the present invention are only examples and should not be construed as the only benefits of the present invention.

While the above disclosure contains many specificities that may or may not be common to all of the embodiments described herein, these specificities are not to be construed as limitations on the scope of the claimed invention, but rather as examples of the preferred embodiments described herein. For example the scope of the method claims should not be construed to cover only methods having the steps occur in the sequence recited herein. Other variations are possible and the scope of the present invention should be determined not by the embodiments described herein but rather by the claims and their legal equivalents. The claims require no implicit limitations. Each claim is to be construed explicitly as stated, or by its legal equivalent.

The invention claimed is:

1. A method of adjusting the dimensions of a hollow product formed by injection molding in a mold that includes a mold cavity that is positioned between a cavity section and a core section of the mold when the cavity section is combined with the core section, wherein the cavity section includes a first cavity surface for forming at least a portion of the outer surface of the hollow product, and a cavity abutment mold part, and the core section includes a first core surface for forming at least a portion of the inner surface of the hollow product, and a core abutment mold part, the method comprising the step of:
   (a) adjusting the position of the first cavity surface relative to the position of the first core surface so that the first cavity surface and the first core surface are in a selected relative position when the cavity section is combined with the core section; and
   wherein when the cavity section is combined with the core section, the cavity abutment mold part can be connected directly to the core abutment mold part and the cavity abutment mold part also can be connected indirectly to the core abutment mold part by a series consisting of abutting mold parts, one rotatable component and another rotatable component;
   wherein the one rotatable component of the series includes at least the shape of a portion of an eccentric ring and has a first edge disposed in circular slideable contact with one mold part of the series;
   wherein the other rotatable component of the series includes at least the shape of a portion of an eccentric ring and has a first edge disposed in circular slideable contact with another mold part of the series;
   wherein a second edge of the one rotatable component is disposed in direct or indirect circular slideable contact with a second edge of the other rotatable component;
   wherein step (a) comprises the steps of:
   (b) rotating the one rotatable component to thereby adjust the relative positions of the first cavity surface and the first core surface; and
   (c) rotating the other rotatable component to thereby adjust the relative positions of the first cavity surface and the first core surface.

2. A method according to claim 1 in combination with a method of injection molding the hollow product, said combination comprising comprises the steps of:
   (d) combining the cavity section with the core section;
   (e) connecting directly the cavity abutment mold part to the core abutment mold part;
   (f) connecting indirectly the cavity abutment mold part to the core abutment mold part, wherein steps (d), (e) and (f) do not have to be performed in any particular order and may be performed simultaneously;
   (g) when the first cavity surface is in the selected relative position in relation to the first core surface, injecting pressurized molding material into the mold cavity; and
   (h) at a time during a period over which the molding material is injected into the mold cavity disconnecting the cavity abutment mold part from the core abutment mold part.

3. A combination of methods according to claim 2, wherein a portion of the mold cavity that defines a sidewall of the product is inclined at an angle of less than approximately one-degree to the longitudinal axis of the mold cavity,
   the combination further comprising the step of:
   (i) disposing a sheet of image-bearing material in relation to the cavity section or the core section so that the sheet of image-bearing material is disposed within the portion of the mold cavity that defines the sidewall of the product when the cavity section is combined with the core section.

4. A combination of methods according to claim 2, wherein a portion of the mold cavity that defines a sidewall of the hollow product is inclined at an angle of approximately one-tenth-of-one-degree to the longitudinal axis of the mold cavity,
   the combination further comprising the step of:
   (i) disposing a sheet of image-bearing material in relation to the cavity section or the core section so that the sheet of image-bearing material is disposed within the portion of the mold cavity that defines the sidewall of the product when the cavity section is combined with the core section.

5. Apparatus for adjusting the dimensions of a hollow product formed by injection molding in a mold that includes a mold cavity that is positioned between a cavity section and a core section of the mold when the cavity section is combined with the core section, wherein the cavity section includes a first cavity surface for forming at least a portion of the outer surface of the hollow product, and a cavity abutment mold part, and the core section includes a first core surface for forming at least a portion of the inner surface of the hollow product, and a core abutment mold part, the apparatus comprising:

one rotatable component and an other rotatable component for adjusting the position of the first cavity surface relative to the position of the first core surface so that the first cavity surface and the first core surface are in a selected relative position when the cavity section is combined with the core section;

means for rotating the one rotatable component to thereby adjust the relative positions of the first cavity surface and the first core surface; and means rotating the other rotatable component to thereby further adjust the relative positions of the first cavity surface and the first core surface;

wherein when the cavity section is combined with the core section, the cavity abutment mold part can be connected directly to the core abutment mold part and the cavity abutment mold part also can be connected indirectly to the core abutment mold part by a series consisting of abutting mold parts, the one rotatable component and the other rotatable component;

wherein the one rotatable component includes at least the shape of a portion of an eccentric ring and has a first edge disposed in circular slideable contact with one mold part of the series;

wherein the other rotatable component includes at least the shape of a portion of an eccentric ring and has a first edge disposed in circular slideable contact with another mold part of the series;

wherein a second edge of the one rotatable component is disposed in direct or indirect circular slideable contact with a second edge of the other rotatable component.

6. Apparatus according to claim 5, wherein the second edge of the other rotatable component is an inner-facing edge of the other rotatable component.

7. Apparatus according to claim 5, wherein the second edge of the one rotatable component is an outer-facing edge of the one rotatable component.

8. Apparatus according to claim 7, wherein the second edge of the other rotatable component is an inner-facing edge of the other rotatable component.

9. Apparatus according to claim 5, wherein the second edge of the one rotatable component and the second edge of the other rotatable component are inclined at an oblique angle to the longitudinal axis of the mold cavity when the cavity section is combined with the core section.

10. Apparatus according to claim 5 in combination with said mold in a system for injection molding the hollow product, wherein the first edge of the other rotatable component abuts a first edge or surface of the cavity abutment mold part; and wherein the first edge of the one rotatable component and the first edge or surface of the cavity abutment mold part are inclined at an oblique angle to the longitudinal axis of the mold cavity when the cavity section is combined with the core section.

11. Apparatus according to claim 5 in combination with said mold in a system for injection molding the hollow product, wherein the first edge of the one rotatable component abuts a first edge or surface of a further cavity mold part; and wherein the first edge of the other rotatable component and the first edge or surface of the further cavity mold part are inclined at an oblique angle to the longitudinal axis of the mold cavity when the cavity section is combined with the core section.

12. Apparatus according to claim 5 in combination with said mold in a system for injection molding the hollow product, wherein a second edge or surface of the cavity abutment mold part abuts a first edge or surface of the core abutment mold part when the cavity abutment mold part is directly connected to the core abutment mold part; and wherein the second edge or surface of the cavity abutment mold part and the first edge or surface of the core abutment mold part are inclined at an oblique angle to the longitudinal axis of the mold cavity when the cavity section is combined with the core section.

13. Apparatus according to claim 5 in combination with said mold in a system for injection molding the hollow product, wherein all of the mold parts and components of the series include edges or surfaces that are (i) disposed for abutting an edge or surface of another mold part or component of the series and (ii) inclined at an oblique angle to the longitudinal axis of the mold cavity when the cavity section is combined with the core section.

14. Apparatus according to claim 5 in combination with said mold in a system for injection molding the hollow product, wherein said system further comprises:

means for injecting pressurized molding material into the mold cavity when the first cavity surface is in the selected relative position in relation to the first core surface, the cavity abutment mold part is connected directly to the core abutment mold part and the cavity abutment mold part also is connected indirectly to the core abutment mold part by said series; and means for disconnecting the cavity abutment mold part from the core abutment mold part at a time during a period over which the molding material is injected into the mold cavity.

15. Apparatus according to claim 5 in combination with said mold in a system for injection molding the hollow product, wherein a plurality of cavity mold parts are shaped for forming threads on a portion of the exterior of the hollow product when the plurality of thread-forming mold parts are combined; and wherein the plurality of thread-forming mold parts are separable for enabling the injection molded hollow product to be removed from the mold.

16. Apparatus according to claim 5 in combination with said mold in a system for injection molding the hollow product, wherein the mold cavity includes flow channels for directing the flow of injected molding material within the mold cavity.

17. Apparatus according to claim 5 in combination with said mold in a system for injection molding a said hollow product having a rim at an opening of the product, wherein sidewall portions of the product at the rim and adjacent the rim are of a substantially uniform thickness.

18. Apparatus according to claim 5 in combination with said mold in a system for injection molding the hollow product and a label disposed in a portion of the mold cavity for forming a sidewall of the product, wherein the sidewall forming portion of the mold cavity in which the label is disposed is at an angle of less than one degree in relation to the longitudinal axis of the mold cavity when the cavity section is combined with the core section.

19. Apparatus according to claim 5 in combination with said mold in a system for injection molding the hollow product and a label disposed in a portion of the mold cavity for forming a sidewall of the product,
    wherein the sidewall forming portion of the mold cavity in which the label is disposed is at an angle of less than one-tenth of one degree in relation to the longitudinal axis of the mold cavity when the cavity section is combined with the core section.

20. Apparatus according to claim 5, wherein the means for rotating the rotatable components are accessible through a space located between the cavity section and the core section.

\* \* \* \* \*